Figure 1:
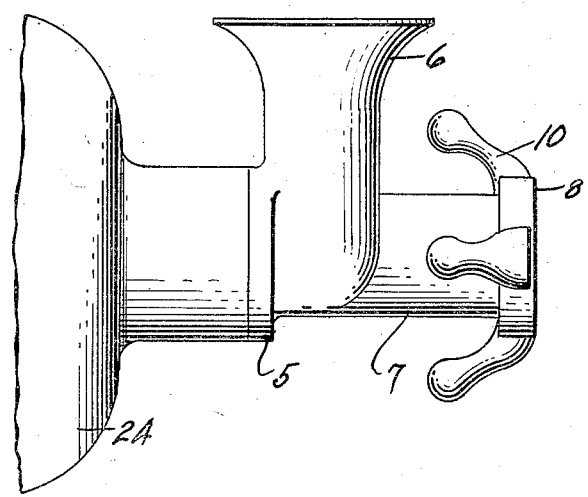

March 29, 1932.  W. F. STIMPSON ET AL  1,851,653
FOOD GRINDING MACHINE
Filed June 28, 1926

INVENTORS.
WALTER F. STIMPSON
WILLIAM W. DRYDEN.
BY Rex Frye
ATTORNEY.

Patented Mar. 29, 1932

1,851,653

UNITED STATES PATENT OFFICE

WALTER F. STIMPSON AND WILLIAM W. DRYDEN, OF LOUISVILLE, KENTUCKY; SAID DRYDEN ASSIGNOR TO SAID STIMPSON

FOOD GRINDING MACHINE

Application filed June 28, 1926. Serial No. 118,959.

This invention relates to machines for grinding foods, such as meats, vegetables, nuts and the like.

One object of our invention is the provision of a separable sleeve member between the main worm feed for advancing the food to be ground and the thrust bearing for the feed shaft, the sleeve being formed with a secondary worm and arranged to protect the thrust bearing from contact with juices, food particles, etc., from the material being ground.

A further object of our invention is the arrangement of an adjustment member for conveniently varying the distance between the stationary and rotary cutter members, which adjustment member is provided with a plurality of arms radially disposed for a short distance from the body portion of the adjustment member and then gradually slanting outwardly and axially of the body portion, whereby arms of comparatively great length but short leverage value are provided enabling ready grasp of the adjustment member without endangering the breakage of the arms or body portion of the adjustment member through rough or inexperienced handling.

Other objects and advantages will be apparent from the following description, wherein reference is made to the accompanying drawings illustrating a preferred embodiment of our invention and wherein similar reference numerals designate similar parts throughout the several views.

Figure 2:
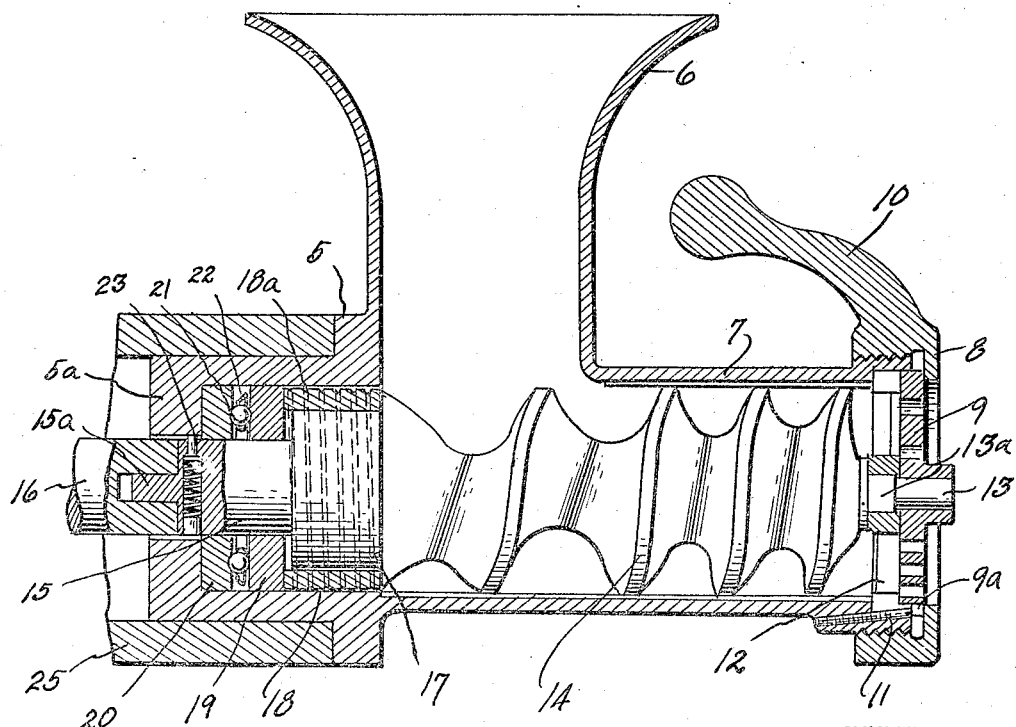

In the drawings:

Fig. 1 is a side elevation of a food grinding machine constructed in accordance with our invention and positioned upon a power transmitting member, the adjacent portion only of which is shown, and Fig. 2 is an enlarged central longitudinal sectional view through the grinding machine.

Referring now to the drawings, the numeral 5 designates a casing for the grinding machine having an inlet throat 6 and a horizontal barrel 7 open at one extremity for the issuance of the products ground in the machine. The open extremity of the barrel 7 is exteriorly threaded for the reception of the adustment member 8, which is herein shown as formed with an apertured body portion arranged to engage the stationary cutter member 9 to vary the position of the cutter member, and with a plurality of radial arms 10 preferably constructed substantially as shown herein to provide a means for conveniently grasping the adjustment member when adjustment of the cutter members of the machine is desired without endangering the breakage of the adjustment member or its arms through rough or inexperienced handling. Toward this end the arms 10 of the adjustment member extend radially from the exterior of the body portion of the adjustment member for a short distance and then slant outwardly and toward the throat 6 of the machine to enable the construction of the arms 10 with comparatively great length for convenient grasping but with relatively small leverage value because of the fact that their effective distance from the center of the adjustment member is materially less than it would be if the arms 10 extended radially for their entire length. The body portion of the adjusting member 8 is formed with an inwardly extending flange adapted to engage the outer face of the stationary cutter member 9, which is slidably mounted within the open end of the casing and is held from rotation by a key 11 threaded through the casing and extending into a notch 9$^a$ in the cutter member 9 or by other suitable means for preventing rotation of the cutter member 9. Preferably the cutter member 9 is formed with a plurality of radially and circumferentially spaced apertures through which the ground products issue and against the forward edges of which the food is adapted to be cut by the rotatable cutter member 12 suitably mounted, as by forming the cutter member 12 with a hub portion having a polygonal aperture adapted to fit over a similarly shaped portion 13$^a$ of the feed shaft.

The feed shaft 13 is herein shown as comprising a main worm 14 extending from the polygonal shaped portion 13$^a$ of the shaft substantially to the rear wall of the inlet throat 6 and arranged to deliver food products placed in the inlet throat to the cutter members 9 and 12. The portion of the feed shaft arranged forwardly of the inlet throat 6 (considering the delivery end of the casing 5 as its rear extremity) is formed with a reduced end portion 15 adapted to extend through the apertured forward wall 5ª of the casing and carrying a tongue 15ª adapted to interfit in the slotted rear extremity of the adjacent end of a power shaft 16, whereby the feed shaft 13 may be rotated when desired while permitting slight longitudinal movements of the feed shaft during adjustment, etc. Between the rear extremity of the reduced portion 15 of the feed shaft and the forward extremity of the main worm 14 the feed shaft is provided with an accurately machined cylindrical seat 17 for a separable sleeve 18 formed on its periphery with a spiral groove 18ª wound to lead all juices, food particles, etc. that may reach the portion of the casing forwardly of the inlet throat 6 back to the main worm portion of the feed shaft. This spiral groove 18ª acts as a secondary worm feed to deliver food particles, juices, etc. to the cutter members, and guards the bearing members hereinafter described from contact with such juices, etc. The sleeve 18 is preferably formed of acid resistant material and is fitted upon the seat 17 in any suitable manner with its rear extremity snugly abutting the forward extremity of the main worm 14 and with its forward extremity projecting beyond the forward extremity of the seat 17 and adapted to snugly engage the adjacent face of the rear race member 19 of a thrust bearing so that the race member will turn with the sleeve, whereby the sleeve member is adapted to prevent the accidental falling of juices, food particles, etc. against the reduced forward extremity 15 of the feed shaft. The thrust bearing herein shown comprises a rear race member 19, a forward race member 20 machined to snugly engage the forward wall 5ª of the casing and a circumferential series of ball bearings 21 suitably spaced in a retaining ring 22 and arranged between the race members 19 and 20. The race members with the ball bearing member between them may be slipped over the reduced portion 15 of the feed shaft and are held thereon by a spring pressed retaining pin 23 carried by the shaft portion 15 forwardly of the race member 20. This construction prevents accidental dislocation of the bearing members while permitting slight movement of the bearing members longitudinally of the shaft, as during adjustment of the position of the shaft.

In use we preferably provide a motor suitably mounted in a casing 24 having a sleeve 25 adapted to fit over the forward extremity of the barrel 7 and operating the power shaft 16. When the motor rotates the feed shaft 13 is rotated to force the food products from the inlet throat 6 to the cutter members 9 and 12 and thence through the apertures in the member 9. The slidable mounting of the non-rotatable cutter member 9 permits of its adjustment toward and away from the rotatable cutter 12, and after the adjacent surfaces of the fixed and rotatable cutters engage further adjustment will move the feed shaft 13 longitudinally, tending to cramp the thrust bearing, but since the rear race member 19 revolves with the feed shaft upon the ball bearings 21 easy rotation of the feed shaft is always permitted. When cramping the thrust bearing the turning of the adjustment member is comparatively difficult, and to render such turning convenient without endangering the life of the adjustment member we provide the arms 10 of comparatively great length for ready grasping but with relatively small leverage value to prevent application of sufficient power to the adjustment member to break the arms or body portion thereof. With the present construction of adjustment member anyone may readily provide the desired adjustment, but the adjustment member is safe against rough handling by inexperienced operators.

It has been found in practice that the secondary worm 18ª is called upon to continually feed juices, food particles, etc. to the main portion of the feed shaft, and accordingly, its surface is continually in contact with corrosive material. Accordingly, the portion of the feed shaft carrying the secondary worm 18ª is ordinarily the first portion to wear and corrode. By putting the secondary worm in a separable sleeve member we render removal of the secondary worm simple and comparatively inexpensive, for it is now no longer necessary to scrap the entire feed shaft because of corrosion adjacent the secondary worm as it has been when such secondary worm was formed upon an integral portion of the feed shaft. Moreover, by permitting the forward extremity of the sleeve 18 to project beyond the forward edge of the seat 17 into contact with the rear race member 19 we have formed a means of effectively preventing the entrance of juices, etc. into engagement with the reduced portion 15 of the feed shaft and the ball bearings 21.

To remove the feed shaft and associated parts for cleansing, the adjustment member 8 is unthreaded from the barrel 7, whereupon the cutter members, feed shaft and bearing members can be removed as a unit. The cutter and bearing members can then be readily slid off the feed shaft and suitably soaked or brushed in any desired manner. When the bearing members are removed from the feed shaft the separable sleeve member 18 can be removed from its seat 17 with appropriate tools, and a new sleeve member substituted therefor.

While it will be apparent that the illustrated embodiment of our invention herein disclosed is well calculated to adequately fulfill the objects and advantages primarily stated, it is to be understood that the invention is susceptible to variation, modification and change within the spirit and scope of the subjoined claims.

Having described our invention, we claim:

1. In a food grinding machine, a casing having a barrel open at its rear end and an inlet throat opening into the barrel intermediate its ends, a feed shaft mounted in the barrel and having a main worm member extending from the inlet to adjacent the open extremity of the barrel, the feed shaft being also formed with a seat portion forwardly of the main worm, and a sleeve fitted over said seat portion and carrying a secondary worm to feed back to the main worm member juices and other matter working forwardly of the main worm member, said sleeve being longer than and extending forwardly of the seat portion and serving to absorb a portion of the thrust imposed upon the shaft and casing upon operation of the machine.

2. In a food grinding machine, a casing having a barrel open at its rear end and an inlet throat opening into the barrel intermediate its ends, a feed shaft mounted in the barrel and having a main worm member extending from the inlet to adjacent the open extremity of the barrel, the feed shaft being also formed with a seat portion forwardly of the main worm, and a sleeve fitted over the seat portion and carrying a secondary worm to feed back to the main worm member juices and other matter working forwardly of the main worm member, said sleeve being longer than and extending forwardly of the seat portion, thereby forming a pocket therebeneath for gathering juices and other matter.

In witness whereof we hereunto set our hands.

WALTER F. STIMPSON.
WILLIAM W. DRYDEN.